F. P. WOOD.
REGISTER.
APPLICATION FILED SEPT. 19, 1916.
1,360,851.
Patented Nov. 30, 1920.
2 SHEETS—SHEET 1.
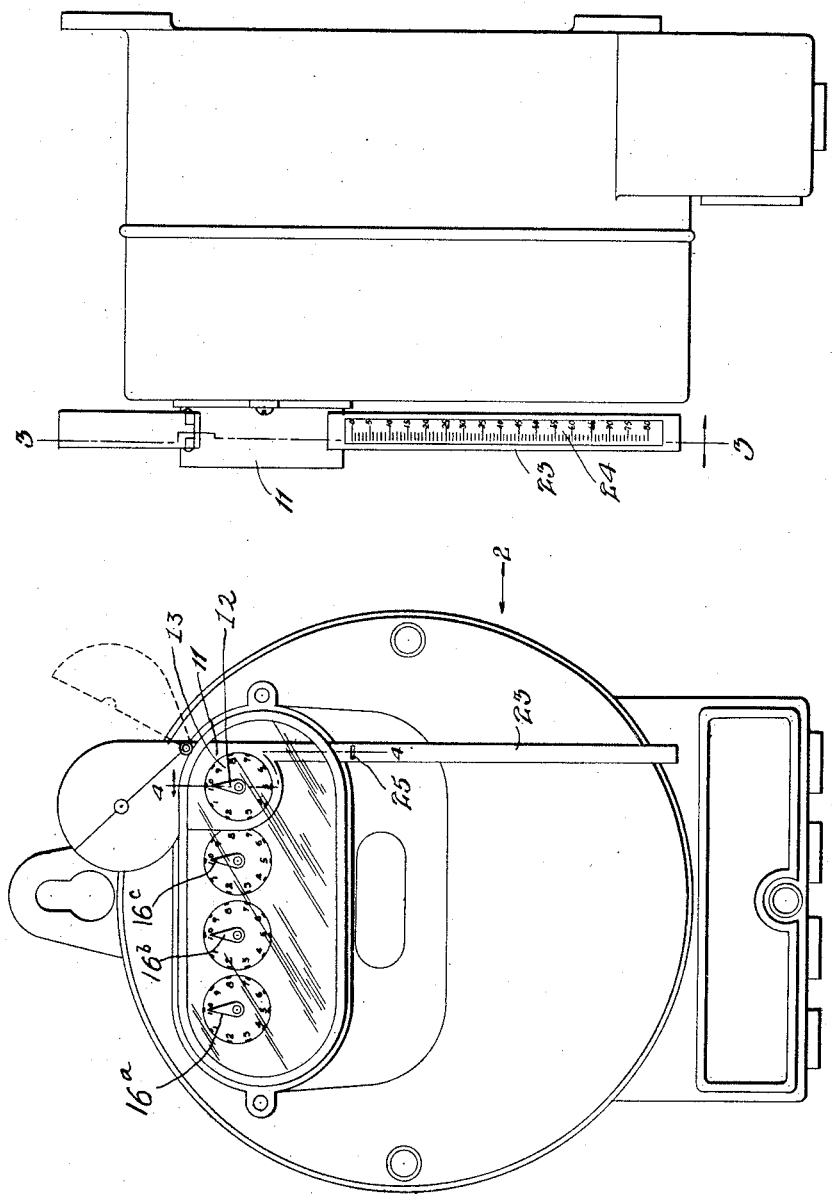
Inventor
Franklin P. Wood
By Mason Fenwick & Lawrence,
Attorneys

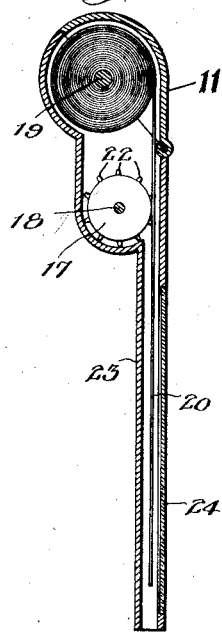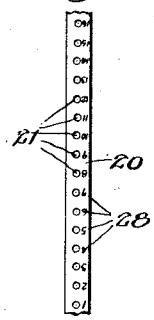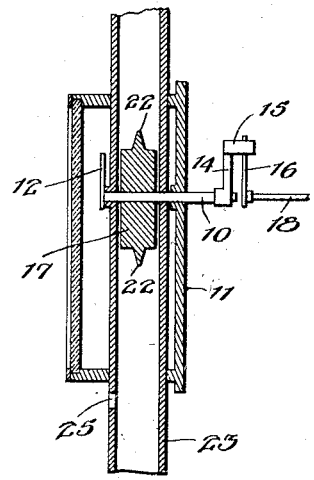

UNITED STATES PATENT OFFICE.

FRANKLIN P. WOOD, OF TRINIDAD, COLORADO.

REGISTER.

1,360,851.  Specification of Letters Patent.  Patented Nov. 30, 1920.

Application filed September 19, 1916. Serial No. 121,078.

*To all whom it may concern:*

Be it known that I, FRANKLIN P. WOOD, a citizen of the United States, residing at Trinidad, in the county of Las Animas and State of Colorado, have invented certain new and useful Improvements in Registers; and I do hereby declare the following to be a full, clear, and exact description of the invention, such as will enable others skilled in the art to which it appertains to make and use the same.

This invention relates to registering mechanism for meters and other recording apparatus, and has for an object to provide a strip of material predetermined lengths of which are fed out by the register, indicating by such length the registered amount.

A further object of the invention is to provide an attachment for a meter exhibiting at all times the strip of material being fed by the meter so that an inspection will indicate at all times the amounts registered since the last severance of the strip.

A further object of the invention is to provide a strip which will in itself, when removed, indicate the amount registered since the last severance of the strip.

A further object of the invention is to provide a record embodying such removed portion of the strip showing the amount registered during any interval of time.

A further object of this invention is to provide an attachment for an ordinary meter which can be easily and quickly installed and taken off and which in itself contains a unit dial to take the place of the unit dial covered up by the said attachment.

With these and other objects in view the invention comprises certain novel features of construction, combination and arrangement of parts as will be hereinafter more fully described and claimed.

In the drawings:

Figure 1 is a view in front elevation of a conventional register of the meter type embodying the present invention.

Fig. 2 is a view of the same structure in side elevation as indicated by arrow 2 at Fig. 1.

Fig. 3 is a sectional view taken on line 3—3 of Fig. 2.

Fig. 4 is a sectional view taken on line 4—4 of Fig. 1.

Fig. 5 is a view in elevation of the record strip, as removed from the meter.

Fig. 6 is a view of the record card with a record strip attached thereto.

Like characters of reference designate corresponding parts throughout the several views.

The improved register which forms the subject-matter of this application is adapted to be used with recording registers of any usual and ordinary type, and is illustrated in the drawing as associated with a meter, such, for instance, as an electric meter, gas meter, water meter, or the like.

To the front or at some convenient place relative to the meter dial, an attachment is secured comprising an auxiliary shaft 10, journaled in a housing 11 secured to the face of the meter by screws or other suitable means, and preferably, though not necessarily, carrying an indicating hand 12 operating in conjunction with an auxiliary dial 13 similar in all substantial respects to the unit dial upon the meter, and receiving motion therefrom by means of a crank arm 14, having a finger 15 bearing against the unit hand 16 found upon the meter. The above-described arrangement is for use in conjunction with meters already constructed, but it is to be understood that the device may be employed in new meter structures by mounting the spur-wheel 17 either upon such auxiliary shaft 10 as shown at Fig. 4, or directly upon the shaft 18 of the regular unit hand of the meter as shown at Fig. 3. Whatever structure is employed, will fall within the disclosure at Figs. 1, 2 and 3, the housing accommodating a spool 19 of material in strip form as shown at 20. The strip 20 is preferably provided with spaced openings 21 properly positioned to be engaged by the spurs 22 of the spur-wheel 17, and thereby fed downwardly through the tube 23. The tube 23 is preferably provided on one side with a glass or like transparent medium 24 through which the strip 20 may be observed, and the tube in some manner is preferably graduated as, for instance, by placing the graduations directly upon the glass plate 24 as shown at Fig. 2. Means for severing the strip within the tube at the point of first observation through the glass plate is provided at the slot 25 through which an instrument may be inserted to sever the strip 20 which, in ordinary practice, will be a strip of paper. By observing through the glass plate 24 the lower end of the strip 20 the observer notes the amount of strip visible which read in conjunction with the graduations upon the glass 24 indicates the amount registered. To produce a record from such register strip so severed, a card 26 is employed as shown at Fig. 6, and the severed sections of the register strip 20 are pasted upon such card 26 which is provided with graduations as indicated at 27 corresponding to the graduations of the strip 20, so that with the upper end of the strip 20 always at a predetermined point the lower end of the strip will indicate the amount registered during the predetermined period as indicated, for instance, on the card in months.

It is also desirable to have the strip 20 provided with numbers corresponding to the meter units, so that when the strip 20 is reversed end for end and pasted on the card 26 the number at the top of any strip will be the number following the number at the bottom of the preceding strip, so that an inspection of the card 26 will at any time indicate whether or not any unauthorized sections of the strip 20 have been removed. Also in this manner the card 26, which may be left with the consumer or adjacent the meter will at all times indicate the amount registered during any such predetermined period, as, for instance, during any months during the year, and of course any number of such cards may be employed so that the consumer will at all times have a complete record of consumption from the beginning.

Assuming the recording apparatus to be an electric meter, the numerals upon the strip will indicate the number of kilowatt hours of current consumed, and if a gas meter, will indicate the number of thousand cubic feet consumed. Applied to any meter the units will indicate the unit of measurement.

On a meter to which this attachment is applied, this attachment renders invisible the unit figure finger 16 and there is therefore provided the substitute unit finger 12, which is actuated by finger 16 driving the dog 13. The other dial fingers on the meter, namely 16ª, 16ᵇ and 16ᶜ, are normally visible through the transparent front of said attachment.

What I claim is:—

1. The combination with an automatic registering meter, of means actuated by the registering mechanism of the meter, for issuing a tape indexed in correspondence with the meter, and a gage tube having a scale through which said tape is issued by said means, said gage providing for the determination of the amount registered without reference to the meter dial and irrespective of the numerical index on the tape, the gage tube having an opening at the base or starting point of the gage scale to permit the severance of the tape when desired.

2. An attachment for meters, comprising a reel housing and an arbor therein for a registering tape, a feed wheel disposed in said housing to engage the tape, a discharge tube through which the said tape is issued from the wheel, the tube having an opening remote from its discharge end to admit of a tool for the severance of the tape at a given point with respect to the feed wheel.

3. In a tape registering attachment to a meter dial, a rotary tape actuator, means on said rotary actuator for engaging and being rotated by a hand index of the dial register, the said engaging means being a dog on the shaft of said rotary actuator.

4. In a tape registering attachment to a meter dial, a rotary tape actuator, means on said rotary actuator for engaging and being rotated by the unit finger of the dial register.

5. In a combined and separable dial and tape register, a rotary tape actuator, a means on said rotary actuator for engaging and being rotated by a hand index of the dial register, the said engaging means being a dog on the shaft of said rotary actuator.

6. The combination with an automatic registering meter, of a substitute dial having a hand rotated by a means for projecting tape, and means for measuring the amount of projected tape.

7. The combination with an automatic registering meter, of a substitute dial having a hand rotated by a means for projecting tape from a spool, and means for measuring the amount of projected tape, and indexed perforations on the tape on said spool corresponding to indices on said measuring means.

8. An attachment for an automatic registering meter having a dial and indicating hand movable on the dial, said attachment comprising a registering tape and means for holding and delivering said tape, said means being operated by the units hand of said meter.

In testimony whereof I affix my signature.

FRANKLIN P. WOOD.